US011892008B2

(12) United States Patent
Botkin et al.

(10) Patent No.: US 11,892,008 B2
(45) Date of Patent: Feb. 6, 2024

(54) CEILING FAN AND BLADE

(71) Applicant: Hunter Fan Company, Memphis, TN (US)

(72) Inventors: Charles William Botkin, Cordova, TN (US); Bobby Neal Norwood, Oakland, TN (US)

(73) Assignee: Hunter Fan Company, Memphis, TN (US)

( * ) Notice: Subject to any disclaimer, the term of this patent is extended or adjusted under 35 U.S.C. 154(b) by 0 days.

(21) Appl. No.: 17/750,882

(22) Filed: May 23, 2022

(65) Prior Publication Data

US 2023/0407879 A1 Dec. 21, 2023

(51) Int. Cl.
*F04D 29/38* (2006.01)
*F04D 25/08* (2006.01)

(52) U.S. Cl.
CPC ......... *F04D 29/384* (2013.01); *F04D 25/088* (2013.01); *F05D 2240/301* (2013.01)

(58) Field of Classification Search
CPC . F04D 29/384; F04D 25/088; F05D 2240/301
USPC ..................................................... 416/223 R
See application file for complete search history.

(56) References Cited

U.S. PATENT DOCUMENTS

| | | | | |
|---|---|---|---|---|
| 5,599,172 A * | 2/1997 | McCabe | F03D 1/0608 | 417/334 |
| 5,630,890 A * | 5/1997 | Smashey | C22F 1/183 | 228/262.71 |
| 5,711,653 A * | 1/1998 | McCabe | F03D 1/0608 | 416/223 R |
| 6,010,307 A * | 1/2000 | McCabe | F03D 1/0608 | 454/351 |
| 6,039,533 A * | 3/2000 | McCabe | F04D 29/384 | 416/223 R |
| 6,190,122 B1 * | 2/2001 | McCabe | F04D 29/384 | 416/223 R |
| 6,250,886 B1 * | 6/2001 | Immell | F04D 29/388 | 416/214 R |
| 6,402,475 B1 * | 6/2002 | Chen | F04D 29/388 | 416/223 R |
| 6,659,721 B1 * | 12/2003 | Parker | F24F 7/007 | 416/223 R |

(Continued)

FOREIGN PATENT DOCUMENTS

CN 103850959 A 6/2014

OTHER PUBLICATIONS

Hunter Pacific International, "Revolution 3", https://www.hunterpacificinternational.com/revolution-3, accessed Nov. 22, 2021, 2 pages, US.

(Continued)

*Primary Examiner* — Logan M Kraft
*Assistant Examiner* — John D Bailey
(74) *Attorney, Agent, or Firm* — McGarry Bair PC

(57) ABSTRACT

A ceiling fan blade moves air about a space, driven by the ceiling fan. The ceiling fan blade can include an upper surface and a lower surface spanning a root and a tip, and a leading edge and a trailing edge. The blade can include a first curved portion along the leading edge and a second curved portion along the trailing edge. The first and second curved portions can include convex upper surfaces and concave lower surfaces, with a flat portion spacing the first and second curved portions.

27 Claims, 3 Drawing Sheets

(56) References Cited

U.S. PATENT DOCUMENTS

| | | | | |
|---|---|---|---|---|
| 6,685,436 | B2 | 2/2004 | Huang | |
| 6,692,231 | B1 * | 2/2004 | Calvert | F04D 29/36<br>416/207 |
| 7,396,212 | B1 * | 7/2008 | Parker | F04D 25/088<br>416/223 R |
| 7,614,852 | B2 * | 11/2009 | Clark | F03D 1/0641<br>416/243 |
| D615,184 | S | 5/2010 | Searle | |
| D631,536 | S * | 1/2011 | Wiegel | D23/413 |
| 8,079,823 | B2 * | 12/2011 | Aynsley | F04D 29/384<br>416/243 |
| 8,162,613 | B2 * | 4/2012 | Oleson | F04D 25/088<br>416/235 |
| 8,235,660 | B2 * | 8/2012 | Hort | F04D 29/662<br>416/19 |
| D715,917 | S | 10/2014 | Hidalgo | |
| D744,084 | S | 11/2015 | Wang | |
| 10,030,628 | B2 * | 7/2018 | Sutz | F03D 80/70 |
| 10,280,943 | B2 * | 5/2019 | Tracy | F04D 29/325 |
| 10,989,226 | B2 * | 4/2021 | Tracy | F04D 29/384 |
| 11,111,930 | B2 * | 9/2021 | Norwood | F04D 25/088 |
| 2002/0041806 | A1 * | 4/2002 | Kim | F04D 29/384<br>416/223 R |
| 2003/0190234 | A1 * | 10/2003 | Huang | F04D 25/088<br>416/232 |
| 2007/0009364 | A1 | 1/2007 | Huang | |
| 2007/0079588 | A1 | 4/2007 | Busick | |
| 2008/0213097 | A1 * | 9/2008 | Oleson | F04D 25/088<br>416/223 R |
| 2010/0054947 | A1 | 3/2010 | Chen | |
| 2010/0104461 | A1 * | 4/2010 | Smith | F04D 29/34<br>416/223 R |
| 2016/0097394 | A1 * | 4/2016 | Golm, Jr. | F04D 19/007<br>29/889.3 |
| 2016/0319843 | A1 * | 11/2016 | Tracy | F04D 25/088 |
| 2019/0249688 | A1 * | 8/2019 | Tracy | F04D 29/325 |
| 2020/0018322 | A1 * | 1/2020 | Norwood | F04D 25/088 |
| 2020/0224536 | A1 | 7/2020 | Norwood et al. | |
| 2022/0082106 | A1 * | 3/2022 | Yang | F04D 29/384 |

OTHER PUBLICATIONS

Craftmade, “Port Arbor—PAR52”, https://www.craftmade.com/port-arbor-par52, accessed Nov. 22, 2021, 1 pages, US.

Minka Group, “Minka Aire Shade—Custom Steel Shade”, https://www.minkagroup.net/fs6831-rd.html, accessed Nov. 22, 2021, 4 pages, US.

Kichler, “Ridley II LED 52" Fan Antique Pewter”, https://www.kichler.com/kichler/products/ceiling-fans/indoor-ceiling-fans/52-inch-ridley-ii-led-ceiling-fan-ap/, accessed Nov. 22, 2021, 6 pages, US.

Hunter, “Hartland Fan”, https://www.hunterfan.com/collections/ceiling-fans/products/ceiling-fans-hartland-with-light-52-inch-famc86?nosto_source=cmp&nosto=618d247f81b440231e4a43f2, accessed Nov. 22, 2021, 10 pages, US.

Minka Group, “Gear—LED 52" Ceiling Fan”, https://www.minkagroup.net/f7361-bs-sdbk.html, accessed Nov. 22, 2021, 5 pages, US.

* cited by examiner

CEILING FAN AND BLADE

FIELD OF INVENTION

This application is directed to a ceiling fan blade for moving a volume of air about a space, and more specifically, to a blade for a ceiling fan for increased operational efficiency.

BACKGROUND

Ceiling fans are machines traditionally suspended from a structure for moving a volume of air about an area. The ceiling fan includes a motor, with a rotor and stator, suspended from and electrically coupled to the structure. A set of blades mount to the rotor such that the blades are rotatably driven by the rotor, and can be provided at an angled orientation to move volume of air about the area.

BRIEF DESCRIPTION

In one aspect, the disclosure relates to a ceiling fan comprising: a motor; and a blade rotatably driven by the motor, the blade defining a longitudinal axis extending between a root and a tip and defining a span-wise direction therebetween, and extending between a leading edge and a trailing edge defining a chord-wise direction therebetween, the blade including a blade body comprising: an upper surface, a lower surface spaced from the upper surface defining a blade thickness, a first curved portion adjacent the leading edge, including first convex surface partially defining the upper surface, and a first concave surface partially defining the lower surface, a second curved portion adjacent the trailing edge, including a second convex surface partially defining the upper surface, and a second concave surface partially defining the lower surface, and a flat portion extending between and spacing the first curved portion and the second curved portion; wherein a first curvature defining the first convex surface is the same as a second curvature defining the second convex surface, and a third curvature defining the first concave surface is the same as a fourth curvature defining the second concave surface, such that the body is symmetric along the longitudinal axis.

In another aspect, the disclosure relates to a blade for a ceiling fan extending span-wise between a root and a tip, and extending chord-wise between a leading edge and a trailing edge, the blade comprising: an upper surface, a lower surface spaced from the upper surface defining a blade thickness, a first curved portion adjacent the leading edge, including first convex surface partially defining the upper surface, and a first concave surface partially defining the lower surface, a second curved portion adjacent the trailing edge, including a second convex surface partially defining the upper surface, and a second concave surface partially defining the lower surface, and a flat portion provided between and spacing the first curved portion and the second curved portion.

In another aspect, the disclosure relates to a method of forming a blade for a ceiling fan, the method comprising: forming a blade body including an upper surface, a lower surface, a root, a tip, a leading edge, and a trailing edge; wherein the blade body includes a first curved portion along the leading edge defined by a first convex surface partially defining the upper surface and a first concave surface partially defining the lower surface, a second curved portion along the trailing edge defined by a second convex surface partially defining the upper surface and a second concave surface partially defining the lower surface, and a flat portion spacing the first curved portion from the second curved portion.

DETAILED DESCRIPTION

Figure 1:
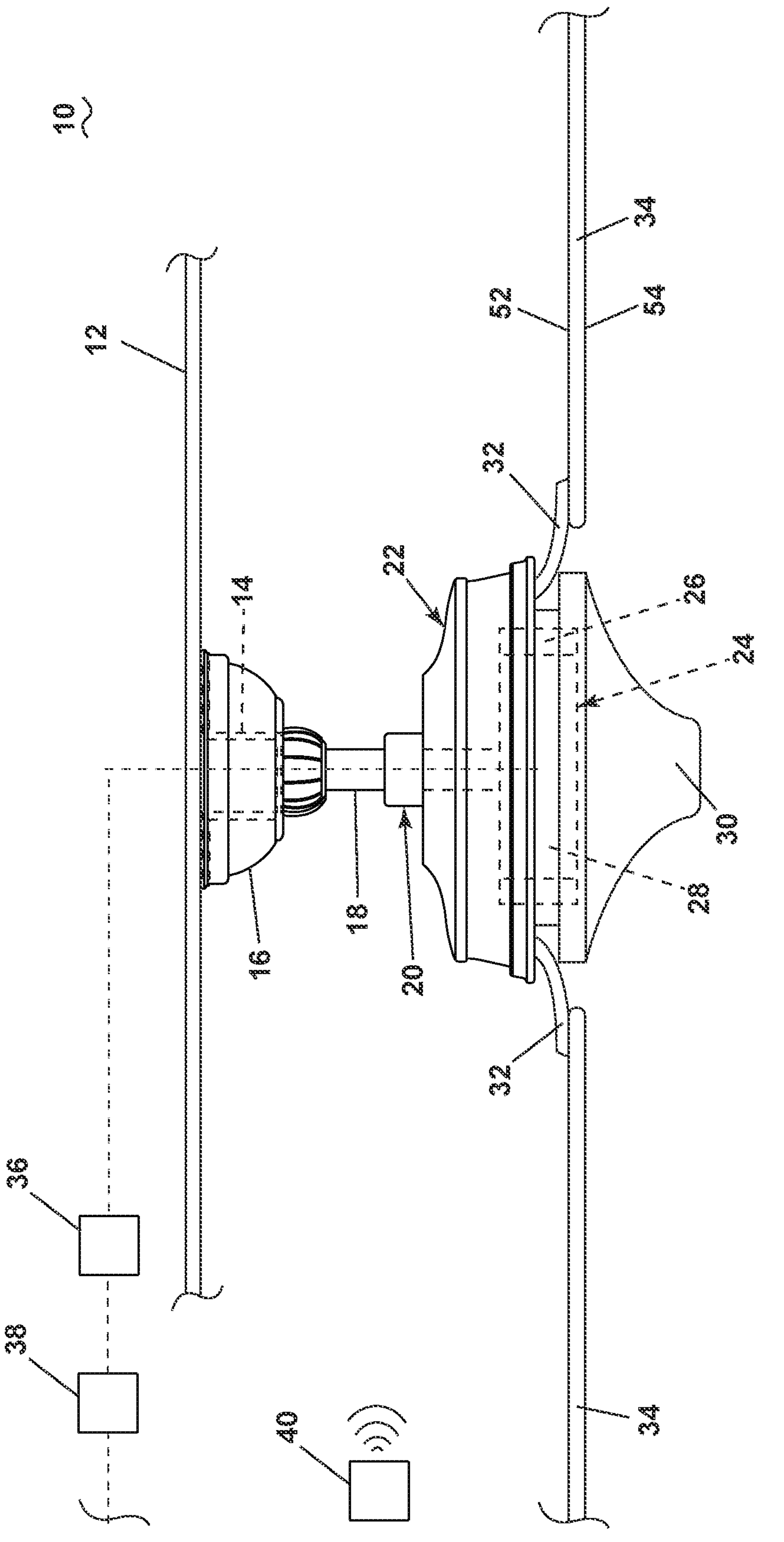
FIG. 1 is a schematic view of a structure with a ceiling fan suspended from a structure.

The disclosure is related to a ceiling fan and ceiling fan blade, which can be used, for example, in residential and commercial applications. Such applications can be indoors, outdoors, or both. While this description is primarily directed toward a residential ceiling fan, it is also applicable to any environment utilizing fans or for cooling areas utilizing air movement.

As used herein, the term "set" or a "set" of elements can be any number of elements, including only one. All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are only used for identification purposes to aid the reader's understanding of the present disclosure, and do not create limitations, particularly as to the position, orientation, or use of aspects of the disclosure described herein. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

Referring now to FIG. 1, a ceiling fan 10 is suspended from a structure 12. In non-limiting examples, the ceiling fan 10 can include one or more ceiling fan components including a hanger bracket 14, canopy 16, a downrod 18, a motor adapter 20, a motor housing 22 at least partially encasing a motor 24 having a rotor 26 and a stator 28, a light kit 30, and a set of blade irons 32. In additional non-limiting examples, the ceiling fan 10 can include one or more of a controller, a wireless receiver, a ball mount, a hanger ball, a light glass, a light cage, a spindle, a finial, a switch housing, blade forks, blade tips or blade caps, or other ceiling fan components. A set of blades 34 can extend radially from the ceiling fan 10, and can be rotatable to drive a volume of fluid such as air. Each blade can include an upper surface 52 and a lower surface 54. The blades 34 can be any suitable fan blade, extending between a root and a tip in a span-wise direction and a leading edge and a trailing edge in a chord-wise direction. The blades 34 can be operably coupled to the motor 24 at the rotor 26, such as via the blade irons 32. The blades 34 can include a set of blades 34, having any number of blades, including only one blade.

The structure 12 can be a ceiling, for example, from which the ceiling fan 10 is suspended. It should be understood that the structure 12 is schematically shown and is by way of example only, and can include any suitable building, structure, home, business, or other environment wherein moving air with a ceiling fan is suitable or desirable. The structure 12 can also include an electrical supply 36 can be provided in the structure 12, and can electrically couple to the ceiling fan 10 to provide electrical power to the ceiling fan 10 and the motor 24 therein. It is also contemplated that the electrical supply be sourced from somewhere other than the structure 12, such as a battery or generator in non-limiting examples.

A controller 38 can be electrically coupled to the electrical supply 36 to control operation of the ceiling fan 10 via the electrical supply 36. Alternatively, the controller 38 can be wirelessly or communicatively coupled to the ceiling fan 10, configured to control operation of the ceiling fan 10 remotely, without a dedicated connection. Non-limiting examples of controls for the ceiling fan 10 can include fan speed, fan direction, or light operation. Furthermore, a separate wireless controller 40, alone or in addition to the wired controller 38, can be communicatively coupled to a controller or a wireless receiver in the ceiling fan 10 to control operation of the ceiling fan 10. It is further contemplated in one alternative example that the ceiling fan be operated by the wireless controller 40 alone, and is not operably coupled with the wired controller 38.

Figure 2:
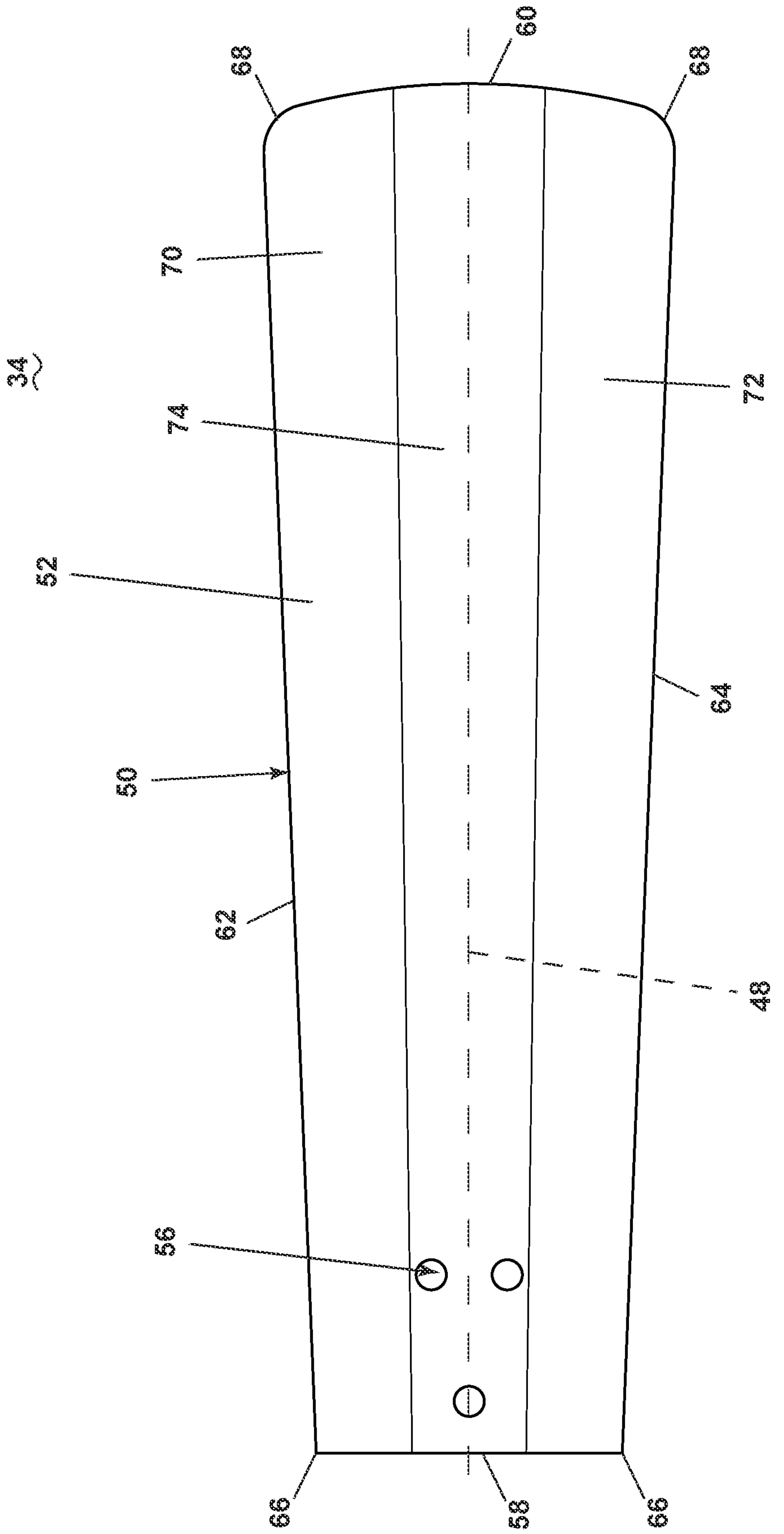
FIG. 2 is a top view showing a blade for use with the ceiling fan of FIG. 1.

Referring to FIG. 2, the blade 34 includes a body 50 with the upper surface 52 visible in the top view, including a set of openings 56 extending through the body 50 between the upper surface 52 and the lower surface 54 (FIG. 1). The body 50 extends between a root 58 and a tip 60, defining a span-wise direction therebetween, and a leading edge 62 and a trailing edge 64, defining a chord-wise direction therebetween. It is contemplated that the leading edge 62 and the trailing edge 64 can be interchanged, for example, such as based upon the rotational direction of the blade 34 in use. As can be appreciated, the top-down shape for the blade 34 includes an increasing chord-wise width in a direction from the root 58 toward the tip 60. As seen from the plan view of FIG. 2, the root 58 is linear, and includes hard corners 66 at the junction between the edges 62, 64 and the root 58. The tip 60 includes a rounded, convex shape, with soft corners 68. It should be appreciated that different top-down blade shapes are contemplated, including but not limited to square, rectangular, increasing widths, decreasing widths, constant widths, with either hard or soft corners, as well as linear or non-linear shapes for the root 58, tip 60, leading edge 62, or trailing edge 64, or combinations thereof, in non-limiting examples. Furthermore, the blade 34 is symmetric about a longitudinal axis 48 extending between the root 58 and the tip 60, centered chord-wise between the leading edge 62 and the trailing edge 64.

The body 50 further includes a first curved portion 70, a second curved portion 72, and a flat portion 74 provided between the first curved portion 70 and the second curved portion 72. The first curved portion 70 can extend along the leading edge 62, spacing the leading edge 62 from the flat portion 74. Similarly, the second curved portion 72 can extend along the trailing edge 62, spacing the trailing edge 64 and the flat portion 74. Each of the first curved portion, the second curved portion 72, and the flat portion 74 can include increasing cross-sectional widths extending from the root 58 toward the tip 60.

Figure 3:
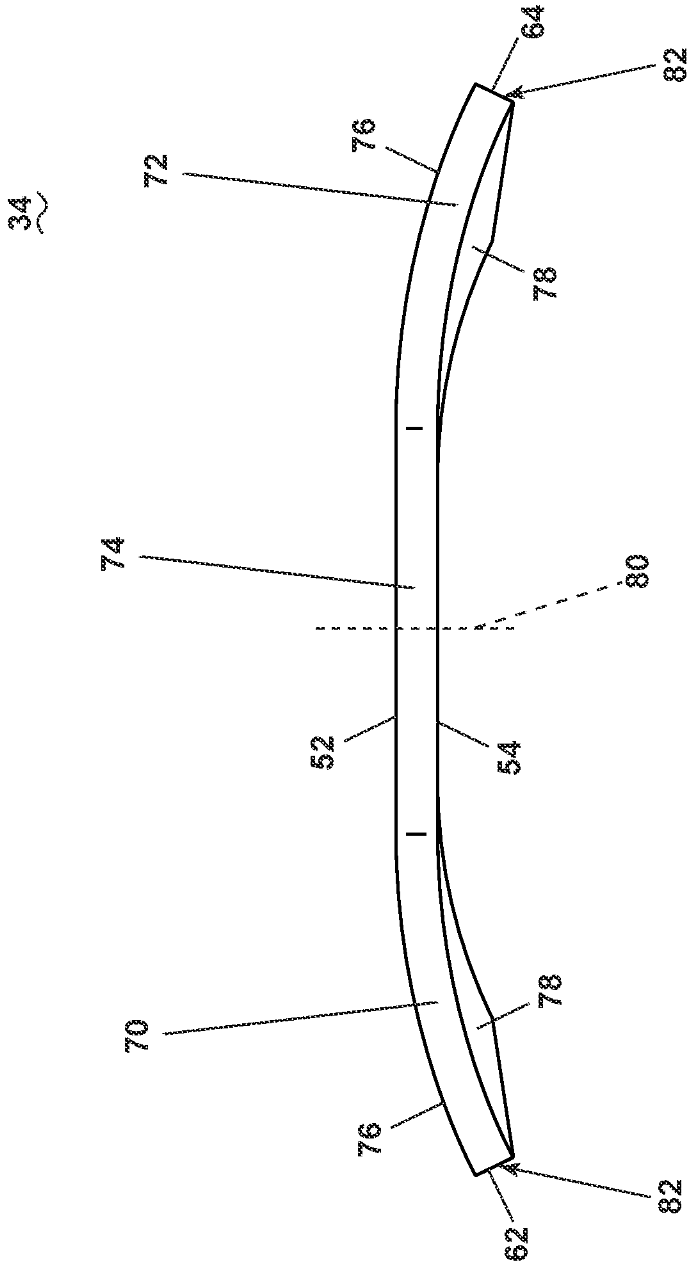
FIG. 3 shows a side view of the blade of FIG. 2.

Referring now to FIG. 3, in looking at the tip 60, it can be seen that each of the leading edge 62 and the trailing edge 64 include a planar surface 82, spacing the upper surface 52 from the lower surface 54. The planar surfaces 82 for the leading and trailing edges 62, 64 can be curved along the shape of the blade 34, such that the plane is defined orthogonal to the upper and lower surfaces 52, 54 locally.

The flat portion 74 is defined by the planar upper surface 52 arranged parallel to the planar lower surface 54. The first and second curved portions 70, 72 are defined by a convex surface 76 for the upper surface 52 and a concave surface 78 for the lower surface 54. A constant thickness for the blade 34 can be maintained between the upper surface 52 and the lower surface 54. Alternatively, it is contemplated that a variable thickness among the first and second curved portions 70, 72 is contemplated, or even where the thickness terminates at one or both of the leading edge 62 and the trailing edge 64, such that the upper surface 52 meets the lower surface 54 at the leading and trailing edges 62, 64.

The blade 34 can be symmetric about a vertical axis 80 aligned with and extending orthogonal to the longitudinal axis 48 of FIG. 2. The symmetry can be defined by the parallel upper and lower surfaces 52, 54 for the flat portion 74, as well as matching curvatures defining the convex surface 76 and the concave surface 78 among the first and second curved portions 70, 72.

Furthermore, each of the convex surfaces 76 and the concave surfaces 78 can define a radius of curvature. Where the curvatures for the convex and concave surfaces 76, 78 are circular, the radius of curvature for the convex surfaces 76 can be greater than that of the concave surfaces 78. Where the blade 34 is symmetric, the radius of curvature for the convex surfaces 76 among the leading and trailing edges 62, 64 can be the same, and the radius of curvature for the concave surfaces 78 can also be the same.

It is contemplated that one or more of the convex and concave surfaces 76, 78, among the leading edge 62 and/or the trailing edge 64, can be similar or different. For example, the curvatures or radius of curvature can be common among the leading edge 62 and the trailing edge 64 in order to define symmetry for the blade body 50. In another example, one or more of the radius of curvature for the convex and concave surfaces 76, 78 can be dissimilar, such that an asymmetry is defined for the blade body 50 resultant of the dissimilarity. In yet another example, the asymmetry can be defined by the chord-wise extent of each of the first and second curved portions 70, 72. In one non-limiting example, the asymmetry can be defined as the first curved portion 70 occupying twice the chord-wise extent of the second curved portion 72 at any span-wise location, or that the second curved portion 72 is twice the chord-wise width of the first curved portion 70.

Where the convex or concave surfaces 76, 78 are elliptical, the radius of curvature varies in the chord-wise direction. In such a case, any radius of curvature for the convex surface 76 can be greater than any radius or curvature for the concave surface 78, defined at the same span-wise and chord-wise position along the body 50. In such an arrangement, the major and minor axes defined by the ellipses for the convex and concave surfaces 76, 78 can be parallel. Furthermore, the major or minor axes can be defined parallel to, or orthogonal to, the flat portion 74.

Further still, in a case where the major and minor axes, defined by elliptical curvatures for the convex and concave surface 76, 78, are non-parallel, it is contemplated that a local chord-wise radius of curvature for the concave surface 78 can be greater than a local chord-wise radius of curvature for convex surface 76, defined at the same chord-wise position, resultant of the non-parallel arrangement. In this example, one of the convex or concave surfaces 76, 78 can include a major or minor axis that is parallel to the flat portion 74, while the major or minor axis for the other of the convex or concave surfaces 76, 78 can be offset from the parallel, such as by an offset angle, which can be +/−5-degrees, for example.

In another example, the chord-wise width for one or both of the first and second curved portions 70, 72 can be 10%-60% of the total chord-wise width, defined locally in the span-wise direction. The chord-wise width for the flat portion 74 can be between 20%-50% of the total chord-wise width, defined locally in the span-wise direction. For example, each of the first and second curved portions could include 30% of the chord-wise width, while the flat portion 74 includes 40% of the chord-wise width. In another example, where the chord-wise width of the blade varies in the span-wise direction, it is contemplated that the percentage of the chord-wise width occupied by each portion 70, 72, 74 can remain constant, despite the variation in total chord-wise width, while a variable chord-wise width is contemplated. In another example, where a blade body is asymmetric, one of the first and second curved portions can be larger than the other, such as the first curved portion occupying 60% of the chord-wise width, the second curved portion occupying 10% of the chord-wise width, and the flat portion occupying 30% of the chord-wise width.

In yet another example, it is contemplated that the percentage of chord-wise width occupied by one or more of the portions 70, 72, 74 can vary in the span-wise direction. Such variation can occur within a constant or varying total chord-wise width. In one example, the chord-wise width occupied by one or both of the curved portions 70, 72 can change+/−5% between the root 58 and the tip 60. Such variation can also result in similar variation among the flat portion 74, such as an increase or decrease in chord-wise width respective of the change of the curved portions 70, 72. In another example, the chord-wise width for the flat portion 74 could vary, such as +/−10% of the total chord-wise width, while one or both of the curved portions 70, 72 could vary to account for the change in chord-wise width for the flat portion 74. Such accounting could be similar among both of the curved portions 70, 72, such that the blade is symmetric, while different accounting could provide for an asymmetry for the blade 34. Such variation in the chord-wise width can be constant, non-constant, increasing, decreasing, variable, sinusoidal, unique, random, discrete, or combinations thereof, and can be specific to one of the portions 70, 72, 74, while it is contemplated that such variation can be shared or common among more than one of the portions 70, 72, 74. Such variation can provide for tailoring the blade to maximize operational efficiency, such as based on span-wise position, while balancing aesthetic user preferences of a traditional flat blade. Where an asymmetry is defined by different chord-wise widths for each of the first curved portion 70 and the second curved portion 72. In such an example, the curvatures for the convex and concave surfaces can differ among the leading and trailing edges 62, 64, resultant of the changed chord-wise width.

In yet another example, the curvature for the portions 70, 72, as well as the convex and concave surfaces 76, 78 included on the portions 70, 72, can be defined. More specifically, the curvature for the convex and concave surfaces 76, 78 can be a circular curvature, an elliptical curvature, a conic curvature, a parabolic curvature, a hyperbolic curvature, a root curvature, a logarithmic curvature in non-limiting examples. Where the curvatures are defined, it is contemplated that the curvatures can be common among one or more of the concave or convex surfaces 76, 78 on the same or different portions 70, 72, while it is contemplated that the curvatures can be different. Where the curvatures are different, it is contemplated that different curvature type can be utilized, such as a elliptical curvature for a first portion and a parabolic curvature for a different second potion. Further still, where such curvatures define related axes, such as a major or minor axis for an ellipse defining an elliptical curvature, those axes can be positioned perpendicular or parallel to the upper or lower surface 52, 54 for the flat portion 74. Utilizing such curvatures can provide for increased efficiency for the ceiling fan blade, as opposed to random curvatures or curvatures that do not follow the same curvature type.

The blade 34 as provided herein provides for increased operational efficiency for a fan blade, while maintaining an aesthetic similar to that of a traditional flat blade that users prefer. The chord-wise widths of the curved portions 70, 72 or the flat portion 74 can be tailored to the particular blade shape, or the particular position on the blade 34; i.e. adjacent the leading edge 62 or the trailing edge 64. Such tailoring can be utilized to increase efficiency of the particular blade 34, such as based on blade length, width, shape, rotational speed, rotational direction, or blade count for the particular ceiling fan.

To the extent not already described, the different features and structures of the various features can be used in combination as desired. That one feature is not illustrated in all of the aspects of the disclosure is not meant to be construed that it cannot be, but is done for brevity of description. Thus, the various features of the different aspects described herein can be mixed and matched as desired to form new features or aspects thereof, whether or not the new aspects or features are expressly described. All combinations or permutations of features described herein are covered by this disclosure.

This written description uses examples to detail the aspects described herein, including the best mode, and to enable any person skilled in the art to practice the aspects described herein, including making and using any devices or systems and performing any incorporated methods. The patentable scope of the aspects described herein are defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A ceiling fan comprising:

a motor; and a blade rotatably driven by the motor, the blade defining a longitudinal axis extending between a root and a tip and defining a span-wise direction therebetween, and extending between a leading edge and a trailing edge defining a chord-wise direction therebetween, the blade including a blade body comprising:

an upper surface, a lower surface spaced from the upper surface defining a blade thickness, a first curved portion, including a first convex surface partially defining the upper surface, and a first concave surface partially defining the lower surface, with the first curved portion defining the leading edge, a second curved portion, including a second convex surface partially defining the upper surface, and a second concave surface partially defining the lower surface, with the second curved portion defining the trailing edge, and a flat portion extending between and spacing the first curved portion and the second curved portion;

wherein a first curvature defining the first convex surface is the same as a second curvature defining the second convex surface, and a third curvature defining the first concave surface is the same as a fourth curvature defining the second concave surface, such that the body is symmetric along the longitudinal axis.

2. The ceiling fan of claim 1 wherein the blade body includes an increasing cross-sectional width extending in the span-wise direction from the root toward the tip.

3. The ceiling fan of claim 2 wherein all of the first curved portion, the second curved portion, and the flat portion include an increasing cross-sectional width extending in the span-wise direction from the root toward the tip.

4. The ceiling fan of claim 3 wherein a rate at which the increasing cross-sectional width increases for each of the first curved portion, the second curved portion, and the flat portion is equal.

5. The ceiling fan of claim 1 wherein the first curved portion, second curved portion and flat portion define a chord-wise cross section, which has the same shape between the root and the tip.

6. The ceiling fan of claim 5 wherein the chord-wise cross section varies in width between the root and the tip while maintaining the same shape.

7. The ceiling fan of claim 6 wherein the blade has a constant thickness between the upper and lower surfaces from the leading edge to the trailing edge.

8. The ceiling fan of claim 1 wherein at least one of the first curved portion and the second curved portion occupies 10-60% of a total chord-wise width of the blade.

9. The ceiling fan of claim 8 wherein both of the first curved portion and the second curved portion occupy 10-40% of the total chord-wise width of the blade.

10. The ceiling fan of claim 8 wherein the flat portion occupies between of the total chord-wise width.

11. The ceiling fan of claim 8 wherein a percentage of the total chord-wise width occupied by both the first curved portion and the second curved portion is the same, and is less than 50% of the total chord-wise width.

12. The ceiling fan of claim 1 wherein the upper surface and lower surface terminate at the trailing edge.

13. The ceiling fan of claim 12 wherein the upper surface and lower surface meet at the trailing edge.

14. The ceiling fan of claim 1 wherein the blade body further includes a set of openings for mounting the blade to the motor, and wherein the set of openings are provided in the flat portion.

15. The ceiling fan of claim 1 wherein the first curved portion and the second curved portion are symmetrical relative to the longitudinal axis.

16. The ceiling fan of claim 1 wherein the first curved portion terminates at the leading edge and the second curved portion terminates at the trailing edge.

17. A blade for a ceiling fan extending span-wise between a root and a tip, and extending chord-wise between a leading edge and a trailing edge, the blade comprising:

an upper surface, a lower surface spaced from the upper surface defining a blade thickness, a first curved portion defining the leading edge, including a first convex surface partially defining the upper surface, and a first concave surface partially defining the lower surface, a second curved portion defining the trailing edge, including a second convex surface partially defining the upper surface, and a second concave surface partially defining the lower surface, and a flat portion provided between and spacing the first curved portion and the second curved portion.

18. The blade of claim 17 wherein a radius of curvature for the first convex surface is greater than a radius of curvature for the first concave surface.

19. The blade of claim 18 wherein a radius of curvature for the second convex surface is greater than a radius of curvature for the second concave surface.

20. The blade of claim 19 wherein the radius of curvature for the first convex surface is equal to the radius of curvature for the second convex surface.

21. The blade of claim 17 wherein the flat portion is defined by the upper surface being parallel to the lower surface.

22. The blade of claim 17 wherein the blade includes a constant thickness between the upper surface and the lower surface.

23. The blade of claim 17 wherein each of the first curved portion, the second curved portion, and the flat portion have an increasing chord-wise width extending in a direction from the root toward the tip.

24. A method of forming a blade for a ceiling fan, the method comprising:

forming a blade body including an upper surface, a lower surface, a root, a tip, a leading edge, and a trailing edge;

wherein the blade body includes a first curved portion defining the leading edge defined by a first convex surface partially defining the upper surface and a first concave surface partially defining the lower surface, a second curved portion defining the trailing edge defined by a second convex surface partially defining the upper surface and a second concave surface partially defining the lower surface, and a flat portion spacing the first curved portion from the second curved portion.

25. The method of claim 24 wherein a radius of curvature for the first convex surface is greater than a radius of curvature for the first concave surface.

26. The method of claim 25 wherein a radius of curvature for the second convex surface is greater than a radius of curvature for the second concave surface.

27. The method of claim 24 wherein a curvature defining the first convex surface is the same as a curvature defining the second convex surface, and a curvature defining the first concave surface is the same as a curvature defining the second concave surface.

* * * * *